United States Patent [19]
Sato et al.

[11] Patent Number: 4,560,997
[45] Date of Patent: Dec. 24, 1985

[54] METHOD AND APPARATUS FOR FORMING A PATTERN

[75] Inventors: Yuichi Sato, Kawasaki; Nobuaki Sakurada, Yokohama; Hideaki Kawamura; Yoshitaka Watanabe, both of Tokyo, all of Japan

[73] Assignee: Canon Kabushiki Kaisha, Tokyo, Japan

[21] Appl. No.: 509,059

[22] Filed: Jun. 29, 1983

[30] Foreign Application Priority Data

Jul. 7, 1982 [JP] Japan ................................ 57-119068
Jul. 8, 1982 [JP] Japan ................................ 57-119495

[51] Int. Cl.⁴ ...................... G01D 15/18; H04N 1/22; H01J 40/14
[52] U.S. Cl. ................................ 346/140 R; 358/298; 250/236
[58] Field of Search ...................... 346/140 PD, 76 L; 358/283, 298; 250/236

[56] References Cited

U.S. PATENT DOCUMENTS

| | | |
|---|---|---|
| 1,656,338 | 1/1928 | Ranger . |
| 1,790,723 | 2/1931 | Ranger . |
| 1,817,098 | 8/1931 | Ranger . |
| 3,681,650 | 8/1972 | Koll . |
| 3,683,212 | 8/1972 | Zoltan . |
| 3,747,120 | 7/1973 | Stemme . |
| 3,864,696 | 2/1975 | Fischbeck . |
| 3,961,306 | 6/1976 | Anstey . |
| 3,977,007 | 8/1976 | Berry . |
| 4,050,077 | 9/1977 | Yamada . |
| 4,272,771 | 6/1981 | Furukawa . |
| 4,339,774 | 7/1982 | Temple ................................ 358/283 |
| 4,342,051 | 7/1982 | Suzuki et al. .................... 358/283 |
| 4,353,079 | 10/1982 | Kawanabe . |
| 4,365,275 | 12/1982 | Berman et al. ................. 358/298 X |
| 4,368,491 | 1/1983 | Saito .................................... 358/283 |
| 4,386,272 | 5/1983 | Check, Jr. et al. ............. 358/298 X |
| 4,389,712 | 6/1983 | Frattarola . |
| 4,394,662 | 7/1983 | Yoshida et al. ................. 358/298 X |
| 4,394,693 | 7/1983 | Shirley ............................ 358/283 X |
| 4,403,874 | 9/1983 | Payne . |
| 4,412,225 | 10/1983 | Yoshida et al. . |
| 4,412,226 | 10/1983 | Yoshida . |
| 4,413,275 | 11/1983 | Horiuchi . |
| 4,438,453 | 3/1984 | Alston ............................. 358/283 X |
| 4,468,706 | 8/1984 | Cahill ............................. 358/283 X |

Primary Examiner—George H. Miller, Jr.
Attorney, Agent, or Firm—Fitzpatrick, Cella, Harper & Scinto

[57] ABSTRACT

Method and apparatus for forming a pattern in which an array duty factor of elementary pattern marks which are elements for forming a picture is no less than 0.5.

17 Claims, 24 Drawing Figures

FIG. 17

| INPUT (FROM MC) | | | | | | OUTPUT (TO DAC) | | | | | | | HS | APPLIED VOLTAGE FOR HEAD (V) | HEAD IN USE | AVERAGE OPTICAL REFLECTION DENSITY |
|---|---|---|---|---|---|---|---|---|---|---|---|---|---|---|---|---|
| MSB | | | | | LSB | MSB | | | | | | LSB | | | | |
| 0 | 0 | 0 | 0 | 0 | 0 | 1 | 0 | 1 | 0 | 1 | 0 | 0 | 0 | 42 | H1 | 0.2 |
| 0 | 0 | 0 | 0 | 1 | 0 | 1 | 0 | 1 | 1 | 0 | 0 | 0 | 0 | 44 | H1 | |
| 0 | 0 | 0 | 1 | 0 | 0 | 1 | 0 | 1 | 1 | 1 | 1 | 0 | 0 | 47 | H1 | |
| 0 | 0 | 0 | 1 | 1 | 0 | 1 | 1 | 0 | 0 | 1 | 0 | 0 | 0 | 50 | H1 | |
| 0 | 0 | 1 | 0 | 0 | 0 | 1 | 1 | 0 | 1 | 0 | 1 | 0 | 0 | 53 | H1 | |
| 0 | 0 | 1 | 0 | 1 | 0 | 1 | 1 | 1 | 0 | 0 | 0 | 0 | 0 | 56 | H1 | |
| 0 | 0 | 1 | 1 | 0 | 0 | 1 | 1 | 1 | 1 | 0 | 0 | 0 | 0 | 60 | H1 | |
| 0 | 0 | 1 | 1 | 1 | 1 | 0 | 0 | 0 | 0 | 0 | 0 | 0 | 0 | 64 | H1 | |
| 0 | 1 | 0 | 0 | 0 | 1 | 0 | 0 | 0 | 1 | 0 | 1 | 0 | 0 | 69 | H1 | |
| 0 | 1 | 0 | 0 | 1 | 1 | 0 | 0 | 1 | 0 | 1 | 0 | 0 | 0 | 74 | H1 | 0.45 |
| 0 | 1 | 0 | 1 | 0 | 0 | 1 | 0 | 1 | 0 | 1 | 0 | 1 | 1 | 42 | H2 | |
| 0 | 1 | 0 | 1 | 1 | 0 | 1 | 0 | 1 | 1 | 0 | 0 | 1 | 1 | 44 | H2 | |
| 0 | 1 | 1 | 0 | 0 | 0 | 1 | 0 | 1 | 1 | 1 | 0 | 1 | 1 | 46 | H2 | |
| 0 | 1 | 1 | 0 | 1 | 0 | 1 | 1 | 0 | 0 | 0 | 0 | 1 | 1 | 48 | H2 | |
| 0 | 1 | 1 | 1 | 0 | 0 | 1 | 1 | 0 | 0 | 1 | 1 | 1 | 1 | 51 | H2 | |
| 0 | 1 | 1 | 1 | 1 | 0 | 1 | 1 | 0 | 1 | 1 | 0 | 1 | 1 | 54 | H2 | |
| 1 | 0 | 0 | 0 | 0 | 0 | 1 | 1 | 1 | 0 | 0 | 1 | 1 | 1 | 57 | H2 | |
| 1 | 0 | 0 | 0 | 1 | 0 | 1 | 1 | 1 | 1 | 0 | 0 | 1 | 1 | 60 | H2 | |
| 1 | 0 | 0 | 1 | 0 | 0 | 1 | 1 | 1 | 1 | 1 | 1 | 1 | 1 | 63 | H2 | |
| 1 | 0 | 0 | 1 | 1 | 1 | 0 | 0 | 0 | 0 | 1 | 0 | 1 | 1 | 66 | H2 | |
| 1 | 0 | 1 | 0 | 0 | 1 | 0 | 0 | 0 | 1 | 0 | 1 | 1 | 1 | 67 | H2 | |
| 1 | 0 | 1 | 0 | 1 | 1 | 0 | 0 | 1 | 0 | 0 | 1 | 1 | 1 | 73 | H2 | |
| 1 | 0 | 1 | 1 | 0 | 1 | 0 | 0 | 1 | 1 | 0 | 1 | 1 | 1 | 77 | H2 | |
| 1 | 0 | 1 | 1 | 1 | 1 | 0 | 1 | 0 | 0 | 0 | 1 | 1 | 1 | 81 | H2 | |
| 1 | 1 | 0 | 0 | 0 | 1 | 0 | 1 | 0 | 1 | 0 | 1 | 1 | 1 | 85 | H2 | |
| 1 | 1 | 0 | 0 | 1 | 1 | 0 | 1 | 1 | 0 | 0 | 1 | 1 | 1 | 89 | H2 | |
| 1 | 1 | 0 | 1 | 0 | 1 | 0 | 1 | 1 | 1 | 1 | 0 | 1 | 1 | 94 | H2 | |
| 1 | 1 | 0 | 1 | 1 | 1 | 1 | 0 | 0 | 0 | 1 | 1 | 1 | 1 | 99 | H2 | |
| 1 | 1 | 1 | 0 | 0 | 1 | 1 | 0 | 1 | 0 | 0 | 1 | 1 | 1 | 105 | H2 | |
| 1 | 1 | 1 | 0 | 1 | 1 | 1 | 0 | 1 | 1 | 1 | 1 | 1 | 1 | 111 | H2 | |
| 1 | 1 | 1 | 1 | 0 | 1 | 1 | 1 | 0 | 1 | 0 | 1 | 1 | 1 | 117 | H2 | |
| 1 | 1 | 1 | 1 | 1 | 1 | 1 | 1 | 1 | 0 | 1 | 1 | 1 | 1 | 125 | H2 | 1.2 |

FIG. 23

| INPUT (FROM MC) | | | | | | OUTPUT (TO DAC) | | | | | | HS | APPLIED VOLTAGE FOR HEAD (V) | HEAD IN USE | AVERAGE OPTICAL REFLECTION DENSITY |
|---|---|---|---|---|---|---|---|---|---|---|---|---|---|---|---|
| MSB | | | | | LSB | MSB | | | | | LSB | | | | |
| 0 | 0 | 0 | 0 | 0 | 0 | 0 | 1 | 1 | 1 | 1 | 1 | 0 | 31 | H1 | 0.1 |
| 0 | 0 | 0 | 0 | 1 | 0 | 1 | 0 | 0 | 0 | 0 | 0 | 0 | 32 | H1 | |
| 0 | 0 | 0 | 1 | 0 | 0 | 1 | 0 | 0 | 0 | 1 | 0 | 0 | 34 | H1 | |
| 0 | 0 | 0 | 1 | 1 | 0 | 1 | 0 | 0 | 1 | 0 | 0 | 0 | 36 | H1 | |
| 0 | 0 | 1 | 0 | 0 | 0 | 1 | 0 | 0 | 1 | 1 | 0 | 0 | 38 | H1 | |
| 0 | 0 | 1 | 0 | 1 | 0 | 1 | 0 | 1 | 0 | 0 | 1 | 0 | 41 | H1 | |
| 0 | 0 | 1 | 1 | 0 | 0 | 1 | 0 | 1 | 0 | 1 | 1 | 0 | 43 | H1 | |
| 0 | 0 | 1 | 1 | 1 | 0 | 1 | 0 | 1 | 1 | 1 | 0 | 0 | 46 | H1 | |
| 0 | 1 | 0 | 0 | 0 | 0 | 1 | 1 | 0 | 0 | 0 | 1 | 0 | 49 | H1 | |
| 0 | 1 | 0 | 0 | 1 | 0 | 1 | 1 | 0 | 1 | 0 | 0 | 0 | 52 | H1 | |
| 0 | 1 | 0 | 1 | 0 | 0 | 1 | 1 | 0 | 1 | 1 | 1 | 0 | 55 | H1 | |
| 0 | 1 | 0 | 1 | 1 | 0 | 1 | 1 | 1 | 0 | 1 | 1 | 0 | 59 | H1 | |
| 0 | 1 | 1 | 0 | 0 | 0 | 1 | 1 | 1 | 1 | 1 | 0 | 0 | 62 | H1 | |
| 0 | 1 | 1 | 0 | 1 | 1 | 0 | 0 | 0 | 0 | 1 | 0 | 0 | 66 | H1 | 0.38 |
| 0 | 1 | 1 | 1 | 0 | 0 | 1 | 0 | 0 | 1 | 0 | 0 | 1 | 36 | H2 | |
| 0 | 1 | 1 | 1 | 1 | 0 | 1 | 0 | 0 | 1 | 1 | 1 | 1 | 39 | H2 | |
| 1 | 0 | 0 | 0 | 0 | 0 | 1 | 0 | 1 | 0 | 1 | 0 | 1 | 42 | H2 | |
| 1 | 0 | 0 | 0 | 1 | 0 | 1 | 0 | 1 | 1 | 1 | 0 | 1 | 46 | H2 | |
| 1 | 0 | 0 | 1 | 0 | 0 | 1 | 1 | 0 | 0 | 1 | 0 | 1 | 50 | H2 | |
| 1 | 0 | 0 | 1 | 1 | 0 | 1 | 1 | 0 | 1 | 1 | 1 | 1 | 55 | H2 | |
| 1 | 0 | 1 | 0 | 0 | 0 | 1 | 1 | 1 | 1 | 0 | 0 | 1 | 60 | H2 | |
| 1 | 0 | 1 | 0 | 1 | 1 | 0 | 0 | 0 | 0 | 1 | 1 | 1 | 65 | H2 | |
| 1 | 0 | 1 | 1 | 0 | 1 | 0 | 0 | 0 | 1 | 1 | 0 | 1 | 70 | H2 | |
| 1 | 0 | 1 | 1 | 1 | 1 | 0 | 0 | 1 | 1 | 0 | 0 | 1 | 76 | H2 | |
| 1 | 1 | 0 | 0 | 0 | 1 | 0 | 1 | 0 | 0 | 1 | 0 | 1 | 82 | H2 | |
| 1 | 1 | 0 | 0 | 1 | 1 | 0 | 1 | 1 | 0 | 0 | 0 | 1 | 88 | H2 | |
| 1 | 1 | 0 | 1 | 0 | 1 | 0 | 1 | 1 | 1 | 1 | 0 | 1 | 94 | H2 | |
| 1 | 1 | 0 | 1 | 1 | 1 | 1 | 0 | 0 | 1 | 0 | 0 | 1 | 100 | H2 | |
| 1 | 1 | 1 | 0 | 0 | 1 | 1 | 0 | 1 | 0 | 1 | 0 | 1 | 106 | H2 | |
| 1 | 1 | 1 | 0 | 1 | 1 | 1 | 1 | 0 | 0 | 0 | 0 | 1 | 112 | H2 | |
| 1 | 1 | 1 | 1 | 0 | 1 | 1 | 1 | 0 | 1 | 1 | 0 | 1 | 118 | H2 | |
| 1 | 1 | 1 | 1 | 1 | 1 | 1 | 1 | 1 | 0 | 1 | 1 | 1 | 125 | H2 | 1.2 |

METHOD AND APPARATUS FOR FORMING A PATTERN

BACKGROUND OF THE INVENTION

1. Field of the Invention

The present invention relates to a pattern forming method, and more particularly to a pattern forming method for forming a pattern by arranging elementary pattern marks which are elements of pattern formation.

The term pattern as herein used includes picture representation as well as character, pattern and graphic representation; the term elementary pattern marks herein used means the minimum units of printed marks to draw a pattern, for example, those corresponding to record dots on a recording medium in dot recording. By way of example, when one picture element or cell (pixcel) is formed by one elementary pattern mark, the elementary pattern mark and the picture cell correspond to each other, but when one picture cell is formed by a plurality of elementary pattern marks, the elementary pattern marks and the picture cell must be recognized differently.

The present invention also relates to an image forming apparatus for forming an image by elementary pattern marks, and more particularly to an image forming apparatus capable of reproducing a high tonality or gradient of image.

2. Description of the Prior Art

In ink dot recording for recording a pattern such as a picture by forming ink dots on a record medium (e.g. record paper) by discharging colored ink droplets, it has been proposed to selectively use inks of different color densities (optical densities) (for respective colors in case of color recording) in order to reproduce a high tonality of image.

When a television image is to be recorded by the ink dot recording which selectively uses the inks of different color densities in order to reproduce the high tonality of image, it is possible to reproduce the image by small diameter dots of high density ink and large diameter dots of low density ink under a given dot pitch for a prepresentation of an image portion of a certain average optical reflection density (if the high and low density inks are used). However, even if the average optical reflection densities of those inks are substantially equal, a resulting printed image appears substantially different in image quality. Although it depends on the ink density and the dot pitch, the image portion represented by the small diameter dots of the high density ink imparts a strong feeling of roughness and it is frequently a significant cause of degradation of the image quality of the image representation.

A theoretical analysis for the above is as follows.

This involves a space-frequency analysis of an image recorded by recording dots of a constant dot pitch and a constant dot diameter with a given color density in a sufficiently wide area on a record medium.

For simplicity, assume a one-dimensional model as shown in FIG. 1. While dots are actually arranged in two dimensions, they may be considered to be one-dimensional on a line passing through centers of the dots when they are viewed in a space-frequency fashion. A brightness distribution is represented by $f(x)$ in FIG. 1, where x represents a positional coordinate on the line and y represents an optical reflection brightness at the position x. A reflection brightness of the record medium (such as paper) is represented by $a_0$ (optical reflection density: $-\log a_0$), a reflection brightness of the colored dot is represented by $a_1$ (optical reflection density: $-\log a_1$), a dot radius is represented by b and dot pitch T is represented by T, and $a = a_0 - a_1$.

Assuming that the dots are arranged in the sufficiently wide area on the record medium, and the number of dots is $2N+1$, then a Fourier transform of $f(x)$ is given by $$F_N(\omega) = \int_{-\frac{T}{2} + NT}^{\frac{T}{2} + NT} f(x) e^{j\omega x} dx \qquad (1)$$

$$= \sum_{n=-N}^{N} \int_{-\frac{T}{2} + nT}^{\frac{T}{2} + nT} f(x) e^{j\omega x} dx$$

$$= \sum_{n=-N}^{N} \left\{ \int_{-\frac{T}{2} + nT}^{\frac{T}{2} + nT} a_1 e^{j\omega x} dx - \int_{-b + nT}^{b + nT} a e^{j\omega x} dx \right\}$$

$$= a_1 \int_{-\frac{T}{2} + NT}^{\frac{T}{2} + NT} e^{j\omega x} dx - a \sum_{n=-N}^{N} \left[ \frac{e^{j\omega x}}{j\omega} \right]_{-b+nT}^{b+nT}$$

$$= a_1 \int_{-\frac{T}{2} + NT}^{\frac{T}{2} + NT} e^{j\omega x} dx - 2ab \cdot \frac{\sin b\omega}{b\omega} \cdot \sum_{n=-N}^{N} e^{jn\omega T}$$

Assuming that N is sufficiently large, the first term of the formula (1) can be regarded as a delta function. Further, $$\sum_{n=-N}^{N} e^{jn\omega T}$$

in the second term can be regarded as a delta function series.

Accordingly, $$F_N(\omega) \xrightarrow{N \to \infty} a_1 \delta(\omega) - \frac{2ab}{T} \cdot \frac{\sin b\omega}{b\omega} \cdot \delta(\omega - \omega_0 k)$$

where $\omega_0 = 2\pi/T$ and k is an integer.

$F_N(\omega)$ when N is sufficiently large is represented by $F(\omega)$ as follows.

$$F(\omega) = a_1 \delta(\omega) - \frac{2ab}{T} \cdot \frac{\sin b\omega}{b\omega} \cdot \delta(\omega_0 k - \omega) \qquad (2)$$

$$F(\omega) = \left( a_1 - \frac{2ab}{T} \right) \delta(\omega) - \frac{2ab}{T} \cdot \frac{\sin b\omega}{b\omega} \cdot \delta(\omega - \omega_0 l) \qquad (3)$$

where l is an integer other than zero. An example of a function by the formula (3) is shown in FIG. 2. In addition to a D.C. component at $\omega = 0$, an impulsative space-angular frequency component at a period of $2\pi/T$ is included since a relation between $\omega$ and a space frequency f is given by $$\omega = 2\pi f \qquad (4)$$

the impulsative space-frequency component at a period of 1/T appears on a space-frequency axis. The formula (3) is rewritten as follows.

$$F(f) = (a_1 - aD)\delta(f) - aD \cdot \left(\frac{\sin \pi DTF}{\pi TDF}\right) \cdot \delta(f - f_0 l) \quad (5)$$

[where $f_0 = 1/T$]

An example of a function of the formula (5) is shown in FIG. 3. By defining a duty factor D as a ratio of a dot diameter $2b$ to the dot pitch T (see FIG. 1), that is, $$D = 2b/T \quad (6)$$

then $$F(f) = \left(a_1 - \frac{2ab}{T}\right) \delta(f) - \frac{2ab}{T} \cdot \frac{\sin 2\pi bf}{2\pi bf} \cdot \delta(f - f_0 l) \quad (7)$$

In the formula (7), the first term represent a D.C. component and it indicates that an average reflection intensity is equal to $(a_1 - aD)$. The second term represent a high frequency component and indicates that it corresponds to a component at a frequency of $1/T$ when $l = 1$ and assumes the following value.

$$F(f_0) = aD \frac{\sin \pi DTf_0}{\pi TDf_0} = aD\left(\frac{\sin \pi D}{\pi D}\right) = \frac{a}{\pi} \sin \pi D \quad (8)$$

When an image is to be represented by forming ink dots at a frequency $f_0$, a frequency band of an image which can actually be represented by such ink dots is approximately $f_0/2$ in accordance with the sampling theory, and components at higher frequencies are regarded as noise. Since the resolution power of the human eye is approximately one minute, the resolution power of a human eye on a record medium at an ordinary viewing distance, that is, at a so-called range of clear vision (25–30 cm) is approximately 10 lp/mm at most. Accordingly, the frequency components in excess of 10 lp/mm can be neglected. Thus, in FIG. 3, assuming that $2f_0 = 10$ lp/mm, the frequency components at approximately $f_0 = 5$ lp/mm significantly affect the feeling of image quality. Accordingly, it may be considered that a magnitude of a power spectrum $F^2(f_0)$ at the frequency $f_0$ significantly affects the feeling of image quality.

From the formula (8), when the duty factor D is changed in a range of 0–1 or larger, the power spectrum $F^2(f_0)$ at the frequency $f_0$ is a sine function as shown in FIG. 4, which is maximum at $D = 0.5$ and zero at $D = 0$ and $D = 1$.

Accordingly, when the image is to be represented by the dots, the power spectrum $F^2(f_0)$ is maximum when the duty factor D is 0.5 and stimulation of the eye by the dot is large. This stimulation gives a feeling of roughness.

Since the power spectrum $F^2(f_0)$ is represented by $$F^2(f_0) = (a/\pi)^2 \sin^2 \pi D \quad (9)$$

it depends on a difference $a$ between the reflection brightness of the colored ink dots and the reflection brightness of the record medium. The smaller the difference $a$ of the reflection brightness is, the smaller is the power spectrum $F^2(f_0)$. Accordingly, it may be considered that the feeling of image quality is enhanced by using ink of as low color density as possible even when the same average optical density is to be represented. In fact, the power spectrum $F^2(f_0)$ when the reflection brightness difference $a$ and the duty factor D are changed such that the first term of the formula (7) $(a_1 - aD)$ is kept constant may be examined.

For example, when a certain average optical density is to be represented by the dots having a duty factor $D_\alpha$ by using ink which causes the reflection brightness of $(a_1 - a_\alpha)$ of the dots on the record medium, it is necessary to satisfy a relation of $$[a - (a_1 - a_\alpha)D_\alpha] = \text{constant} \quad (10)$$

From the formula (10), $$a_\alpha D_\alpha = \text{constant} \quad (11)$$

and the power spectrum $F^2(f_0)$ is represented by $$F_\alpha^2(f_0) \propto \left(\frac{a_\alpha}{\pi}\right)^2 \sin^2 \pi D_\alpha \quad (12)$$

$$\propto \left(\frac{\sin \pi D_\alpha}{\pi D_\alpha}\right)^2$$

The formula (12) is a monotonously decreasing function in a range of $0 \leq D \leq 1$ as shown in FIG. 5. Thus, the closer to unity the duty factor D is, the smaller is the power spectrum $F_\alpha^2(f_0)$. Thus, in order to represent the same average optical density, a higher image quality is obtained by reducing the difference between the reflection intensities of the dots and the record medium (that is, by using the ink of as low color density as possible) and bringing the duty factor close to unity.

To state it differently, the power spectrum $F^2(f_0)$ is maximum at $D = 0.5$ as shown in FIG. 6 whether the high density ink is used or the low density ink is used, but the power spectrum $F^2(f_0)$ when the low density ink is used is larger. Accordingly, it is said from qualitative analysis that the low density ink can better enhance the feeling of image quality. It was proved in an experiment that the roughness was not noticeable at the duty factor D of 0.5 when the low density ink was used but the roughness was noticeable when the high density ink was used. An area having the duty factor D higher than A, which is a minimum value of the power spectrum which causes roughness, noticeably adversely affects the image quality. Accordingly, the smaller the area having the duty factor larger than A is, the better is the quality of the image as a whole.

As to a high frequency component, the same is applicable as shown in FIG. 7.

By way of example, FIG. 6 shows power spectra of patterns formed by dots on a white paper having an optical reflection density of approximately 0.1 (reflection factor: approximately 80%) by using a high density ink selected from inks having ink density of 1–2 (dye or pigment content: approximately 2–5% by weight) and a low density ink selected from inks having ink density of 0.3–0.6 (dye or pigment content: approximately 0.2–0.5% by weight), at a dot space frequency of 5 dots/mm (called the number of pels), that is, at a dot pitch T of 200 μm. In an experiment, when an ink having the ink density of 0.6 (dot reflection factor: 10%)

was used the power spectrum $F^2(f_0)$ at the duty factor D of 0.5 under the same condition (the same number of pels and the same record medium) exceeded A shown in FIG. 6.

The ink density ID is defined by $$ID = \log 10 \frac{I_{in}}{I_{th}}$$

where $I_{in}$ is a light intensity irradiated to the ink and $I_{th}$ is an intensity of transmitted light therefrom. The optical reflection density OD is defined by $$OD = \log 10 \frac{I_i}{I_0}$$

where $I_i$ is a light intensity irradiated to a given area and $I_0$ is an intensity of reflected light therefrom.

While N was assumed to be sufficiently large in the above theoretical analysis, the conclusion may be applicable to a case where N is 1 or larger. The above analysis is based on the relative density of the ink dots to the record medium rather than the absolute density. However, since white paper having a very low optical reflection density (e.g. approximately 0.1) is frequently used as the record medium, the above conclusion is substantially valid when only the absolute density of the ink dots is considered. The characteristic curve shown in FIG. 6 varies in accordance with the dot frequency $f_0$ or the number of pels, but since the resolution power of the human eye is approximately 10 pels, the feeling of roughness is critical when the number of pels is larger than 10 or the dot pitch is smaller than 100 μm. More specifically, the number of pels of 4-6 is most critical. (The representation of the image is not suitable with the smaller number of pels and the feeling of roughness is relieved with the larger number of pels.)

While the curve in FIG. 6 was depicted for the black ink, a more or less similar tendency is observed for other colors.

While the pattern formation by the ink dots has thus for described, the same is true for electronic photographing, thermal recording (thermal transferring) and electrostatic recording.

In the ink jet printer, the following methods have been proposed to reproduce a high tonality of image.

In a first method, the quantity of liquid discharged from an ink jet head is controlled to vary a diameter of dots printed so that the tonality is represented.

In a second method, the dot diameter is not varied but each picture cell comprises 4×4 sub-pixcel matrix, to which a dither method is applied to reproduce the tonality. In the first method, it is difficult practically to attain a wide range of printable dot diameters and only several steps of tonalities can be reproduced. It is therefore insufficient to print out a television image or a photograph image.

The second method resolves the disadvantage of the first method. When one picture cell comprises a 4×4—matrix, it is possible to reproduce 17 steps of tonalities. However, a print speed is 1/16 of that of the first results because each picture cell comprises 4×4=16 sub-cells, or the number of print heads must be increased by a factor of 16 in order to increase the print speed. However, this results in a complex structure of print heads and a large electric circuit for processing the image by the dizzer method. As a result, a total cost is significantly increased.

The diameter of the dot which can be formed by a certain ink jet head is 70–280 μm. When it is desired to attain the high tonality by varying the dot diameter, a maximum dot diameter of approximately 200 μm–280 μm is required, and when overlapping areas are small, each pixcel comprises 4–6 dots/mm (which is referred to as pels). In a video printer which reproduces an image from a television signal, the number of pixcels is 525×(525×(4/3)) because the number of scan lines in one frame of the television signal is 525 for the NTSC system. Of those, the number of pixcels in an effective screen area is approximately 480×640 dots.

Thus, when each pixel comprises 5 pels, a screen size is 96×128 mm which is suitable for viewing in a range of clear vision.

When inks of different color densities are used, smaller dots are to be formed by the ink of higher color density or larger dots are to be formed by the ink of lower color density in order to attain the same average optical reflection density. However, even if the reflection densities are equal, there is a big difference between the feeling of image quality. Specifically, the image represented by the high color density ink imparts feeling of higher roughness than the image represented by the low color density ink, and the image quality of the former is lower.

When a minimum density dot is to be represented by non-print of dot, white areas appear on the printed image. The tone of the white areas is clearly different from the tones of the other dot-printed areas. As a result, the image quality is degraded.

From the above analysis, it is seen that a higher quality of image is obtained as a whole when the high density dots are not used, but the range of tonality attainable by only low density dots is limited.

SUMMARY OF THE INVENTION

It is an object of the present invention to provide a pattern forming method for forming a pattern by arranging elementary pattern marks which are the base of the pattern formation, which method is characterized by the formation of a pattern which imparts an excellent feeling of quality to human beings and which is useful in forming the pattern by selectively using the elementary pattern marks of different densities.

In accordance with one aspect of the present invention, a duty factor of a size of the mark in the direction of an array to an array pitch is no less than 0.5 for sequential elementary pattern marks of relatively high optical reflection density.

In accordance with a second aspect of the present invention, the duty factor (ratio) of the size of the mark in the direction of the array to the array pitch is no less than 0.5 for the array pitch of higher than a predetermined pitch for the sequential elementary pattern marks of the relatively high optical reflection density.

In one embodiment according to the second aspect of the present invention, it is proposed to select the duty factor (ratio) of no less than 0.5 when the array pitch of the elementary pattern marks is no less than 100 μm while taking the limit of resolution power of a human beings eye into consideration.

In embodiments in accordance with the first and second aspects of the present invention, it is proposed to raise a lower limit of the duty factor as the optical reflection density of the elementary pattern marks increases, to set the duty factor (ratio) to no less than 0.5 for the elementary pattern marks having the optical reflection density of approximately 0.6 or higher based on the above experimental result, and to form a pattern of a lower average optical reflection density than an average optical reflection density of a pattern formed by the elementary pattern marks of the high optical reflection density at the lower limit duty factor, with the elementary pattern marks of lower optical reflection density than the elementary pattern marks of the high optical reflection density. Those are very useful in obtaining a high quality of image in an image design.

The lower limit of the duty factor is not suitable when the dot pitch of 4–6 pels is adopted in forming the pattern by the ink dots, as seen from the above experimental result but it should be understood that the above condition is not limitative.

It is another object of the present invention to provide an image forming apparatus which attains a wide range of tonality and produces an image which does not cause roughness to be noticeable.

In order to achieve the above object, a minimum elementary pattern mark of the elementary pattern marks of high optical reflection density is set to be larger than a minimum elementary pattern mark of the elementary pattern marks of low optical reflection density.

The other objects of the present invention will be apparent from the following detailed description taken in conjunction with the accompanying drawings.

BRIEF DESCRIPTION OF THE DRAWINGS

FIG. 17 illustrates relations among an input digital value to the matrix circuit MXC, an output code, a selected head and a reflection density, FIG. 23 illustrates relations among an input digital value to the matrix circuit MXC of FIG. 22, an output code, a selected head and an optical reflection density.

DETAILED DESCRIPTION OF THE PREFERRED EMBODIMENTS

In the embodiments described below, the present invention is applied to an apparatus which forms a pattern by flying colored ink dots, although the present invention is not limited to such an ink jet apparatus but equally applicable to an electrographic apparatus, a thermal recording apparatus and an electrostatic recording apparatus, as described above.

The terms ink density and optical reflection density herein used are defined as described above. They are measured in the following manners. The ink density is measured by a commercially available dencitometer for an area of 10 mm square uniformly coated with a pattern forming material (e.g. ink). The optical reflection density of the pattern area is measured by the dencitometer for a pattern area formed by arranging elementary pattern marks in an area of 10 mm square. In practice, a reference measurement value as set by a standard white paper having an optical reflection density of approximately 0.1. In the above experiment by the ink dots, the optical reflection density was measured by the dencitometer for an area of 10 mm square of a 5×5—dot matrix formed in 1 mm square and it was used as the average optical reflection density of the pattern area. (The above is applicable to the embodiments to be described hereinlater).

Figure 8A:
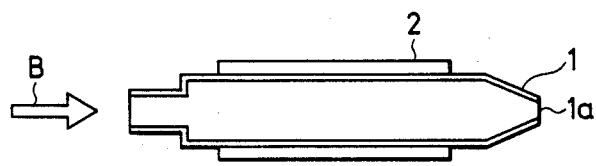
FIG. 8(a) is a sectional view of an ink jet head.
Figure 8B:
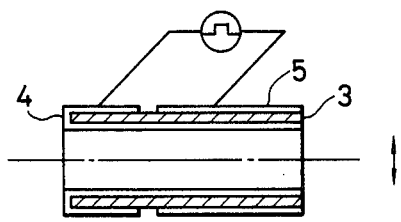
FIG. 8(b) is a sectional view of a piezo resonator.

FIG. 8 shows an ink jet head for producing flying ink dots. Numeral 1 denotes a glass tube having a reduced tip end, numeral 2 denotes a piezo resonator externally contacted to the glass tube 1, numeral 3 denotes a tubular piezo element, and numerals 4 and 5 denote electrodes. By applying a pulsative voltage across the electrode 4 and 5, the glass tube 1 is contracted and released diametrically. By supplying an ink in the direction of an arrow B, ink droplet is discharged from an orifice 1a at the reduced tip end of the glass tube 1. By controlling an amplitude of the voltage applied to the piezo element 3, the size of the discharged ink droplet can be varied. In an experiment, the ink dot diameter was variable by a factor of approximately three. The change in the diameter by the factor of three corresponds to a change in an area by a factor of nine and is not sufficient to reproduce the tonality for the purpose of image representation.

Figure 9:
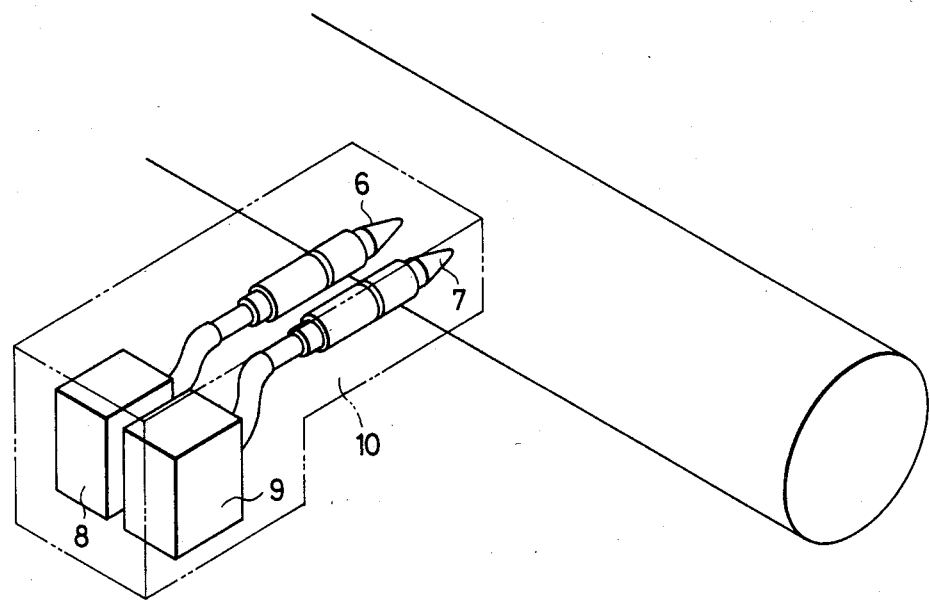
FIG. 9 shows a structure of an ink jet ahead.

Accordingly, as shown in FIG. 9, an ink jet head unit 10 having two heads 6 and 7 and ink tanks 8 and 9 containing inks of different densities is provided.

Figure 10:
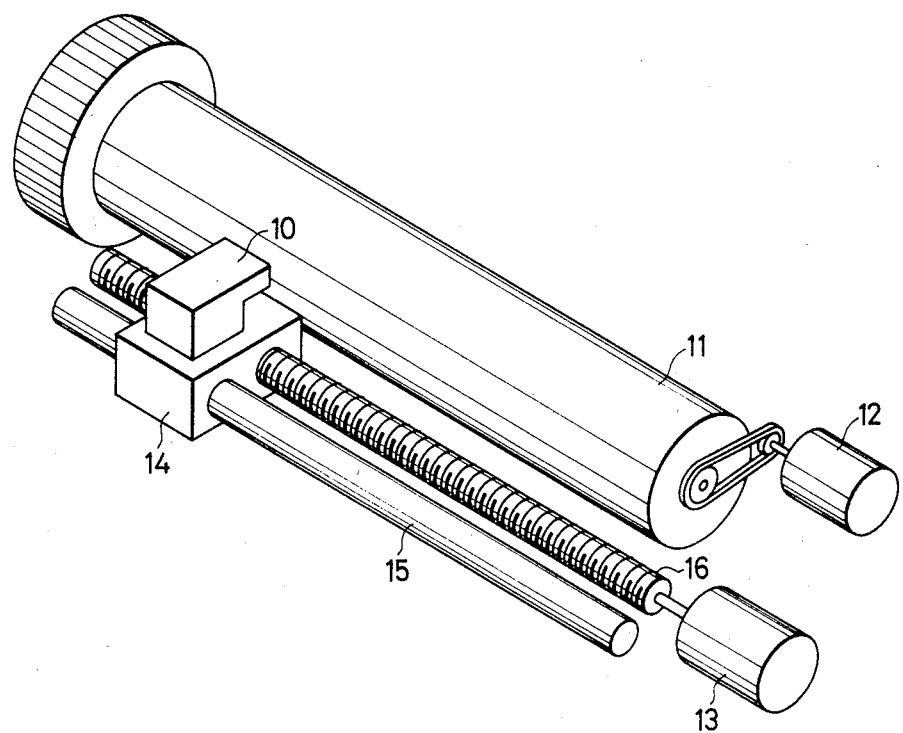
FIG. 10 is a perspective view of a printer to which the head of FIG. 9 is applied.

FIG. 10 shows a mechanical construction of a printer having the head unit 10 of FIG. 9 mounted therein. Numeral 11 denotes a platen, numeral 12 denotes a pulse motor for feeding a paper and numeral 13 denotes a motor which scans a head carriage 14 carrying the head unit 10 by a guide 15 and a screw 16.

By forming dots at 5 pels by the ink jet apparatus of FIGS. 9 and 10, several embodiments were obtained.

Embodiment 1

Figure 11:
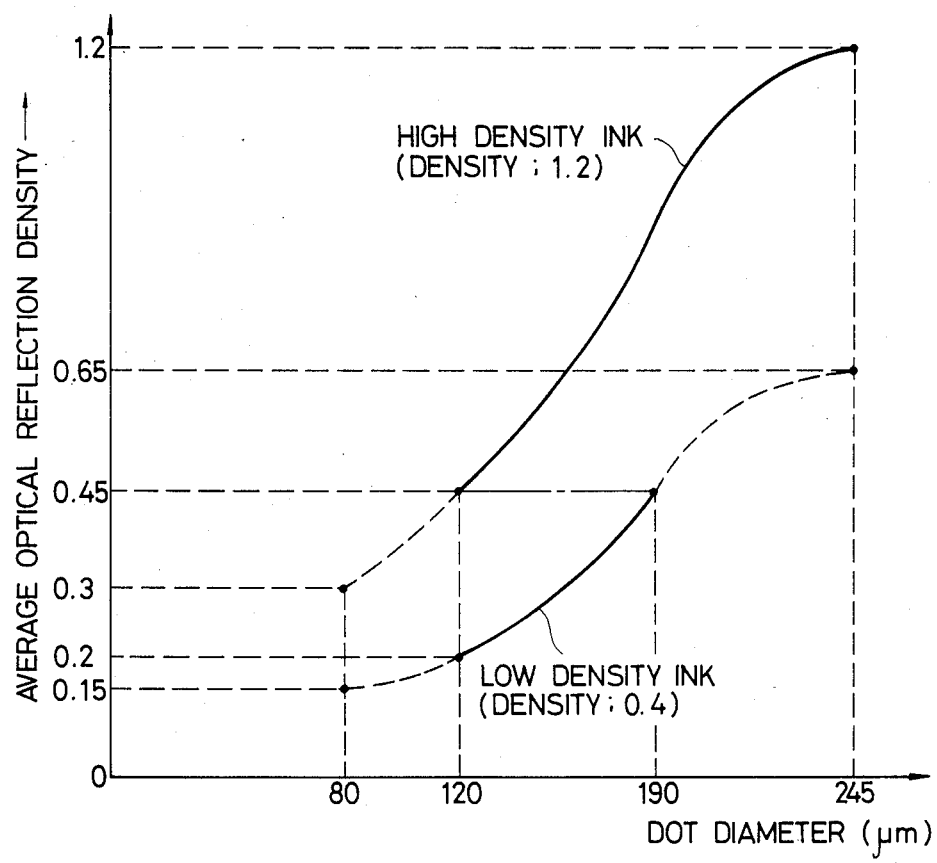
FIG. 11 is a dot diameter versus average reflection density characteristic chart in a first embodiment of image design.

In FIG. 11, the ordinate represents an average optical reflection density and the obscissa represents a dot diameter. Solid lines indicate usable ranges of the inks and broken lines indicate non-usable ranges although patterns can be formed within those ranges. As seen from FIG. 11, the dot diameter formed by the ink heads (6 and 7 in FIG. 9) is approximately 80 μm–245 μm for the orifice diameter of 50 μm for both the high density ink and the low density ink. A range of the average optical reflection density of the dots represented by those dots is 0.3–1.2 for the high density ink having an ink density of 1.2 (dye or pigment content: 4% by weight), and 0.15–0.65 for the low density ink having an ink density of 0.4 (dye or pigment content: 0.3% by weight). The average optical reflection densities of the dots represented by the high density ink and the low density ink overlap in the range of 0.3–0.65. Thus, within this range, the dots can be represented by any one of the inks. In the present embodiment, in order to bring the duty factor of the dots represented by the high density ink close to unit, a point at which the dot diameter of the high density ink reaches 110 μm, that is, the average optical reflection density of 0.45 is used as a switching level.

Accordingly, an average optical reflection density range of 0.2–0.45 (or a dot diameter range of 120–190 μm) is covered by the low density ink, and an average optical reflection density range of 0.45–1.2 (a dot diameter range of 120–245 μm) is covered by the high density ink. A minimum dot diameter used is 120 μm for both the high density ink and the low density ink.

Since the dot pitch is 200 μm (5 pels), a one-dimensional duty factor D of the high density ink is 120 μm/200 μm=0.6 for the minimum dot and stimulation to the eye is very small according to theoretical analysis. In an experiment, an area represented by the high density ink imparts substantially no difference in a feeling of quality from that represented by the low density ink, and the roughness is not noticeable.

In the present embodiment as well as Embodiments 2 and 3 to be described later, a small dot of the low density ink is formed at 5 pels for a minimum density area or a maximum intensity area of the image. As a result, white areas disappear and change of the image tone is prevented, and image quality is improved.

Embodiment 2

Figure 12:
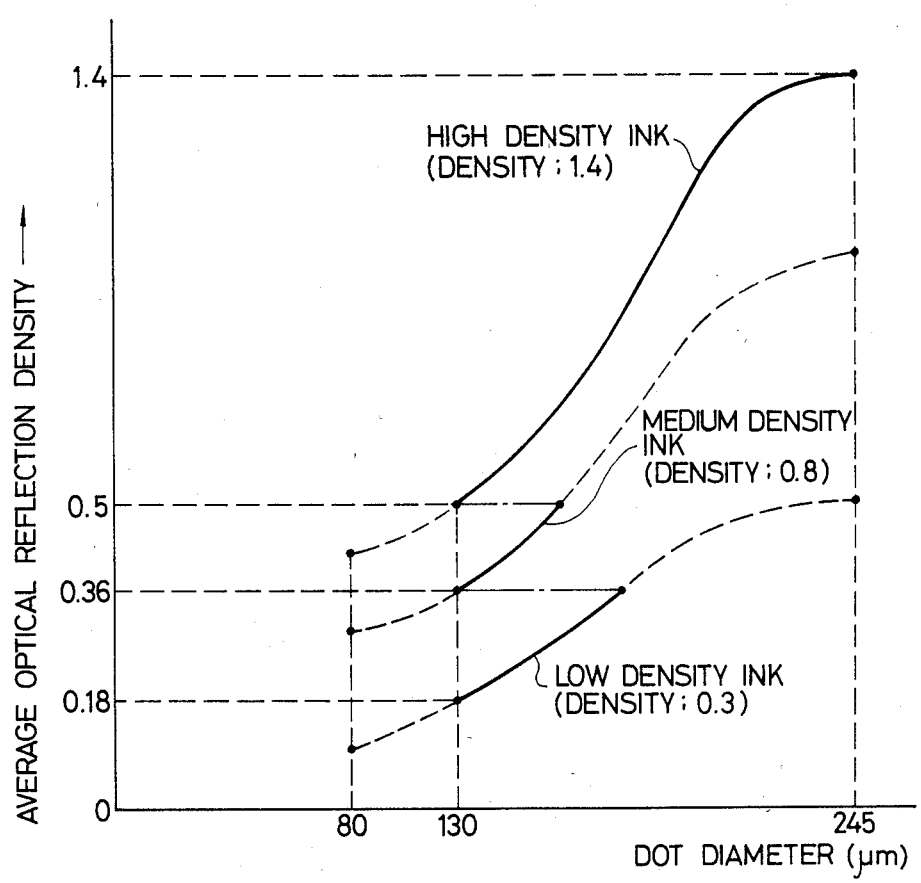
FIG. 12 is a dot diameter versus average reflection density characteristic chart in a second embodiment of image design.

FIG. 12 shows a dot diameter versus average optical reflection density characteristic in Embodiment 2. In the Embodiment 2, three ink jet heads are used instead of two shown in FIG. 9 and three ink tanks are used accordingly so that high, medium and low density inks are discharged from the respective ink jet heads. The ink densities are 0.3 (dye or pigment content: 0.2% by weight) for the low density, 0.8 (dye or pigment content: 0.7% by weight) for the medium density, and 1.4 (dye or pigment content: 4.5% by weight) for the high density. The three ink jet heads each has an orifice diameter of 50 μm and the number of pels is 5. As shown in FIG. 12, the low density ink covers an average optical reflection density range of 0.18–0.36, the medium density ink covers 0.36–0.5 and the high density ink covers 0.5–1.4. The minimum dot diameter is 130 μm for the low, medium and high density inks. Accordingly, a duty factor D of the minimum dot of the high density ink is 0.65. The lower limit of the duty factor D is raised from that of the Embodiment 1 (0.6→0.65) as the density of the high density ink is raised (1.2→1.4).

No difference in the feeling of quality was observed among the pattern areas formed by the three different inks, and roughness was not observed. A minimum optical reflection density of 0.18 was attained.

Embodiment 3

Figure 13:
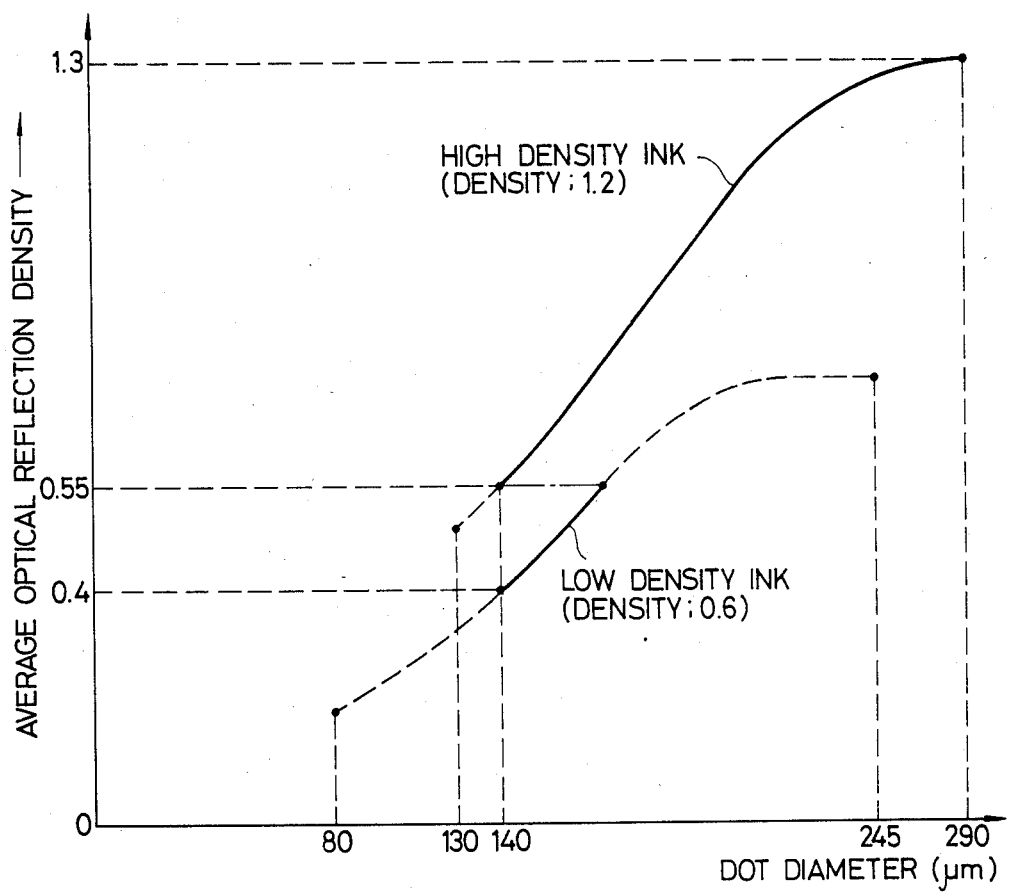
FIG. 13 is a dot diameter versus average reflection density characteristic chart in a third embodiment of image design.

FIG. 13 shows a dot diameter versus average optical reflection density characteristic when the orifice diameters of the ink jet heads 6 and 7 of FIG. 9 are 50 μm and 65 μm, respectively, the low density ink (ink density: 0.6, dye or pigment content: 0.5% by weight) is discharged by the 50 μm orifice diameter head, and the high density ink (ink density: 1.2, dye or pigment content: 4% by weight) is discharged by the 65 μm orifice diameter head. The number of pels is 5.

As seen from FIG. 13, a maximum dot diameter of 290 μm was attained with the high density ink head and a maximum average optical reflection density of 1.35 was attained. Because the overlapping areas of the dots increase, the average optical reflection density increases. Since the representation by the dots having the diameter of less than 140 μm (duty factor D: 0.7) is not necessary for the high density ink, a wide range of reflection density is attained by using the high density ink head having a large orifice diameter. By combining the present embodiment with the Embodiment 2 so that three inks of different densities are used with different orifice diameters, a wider range of reflection density is attained and a high tonality of image is reproduced.

An embodiment of a control circuit for implementing the Example 1 shown in FIG. 11 is now explained.

Figure 14:
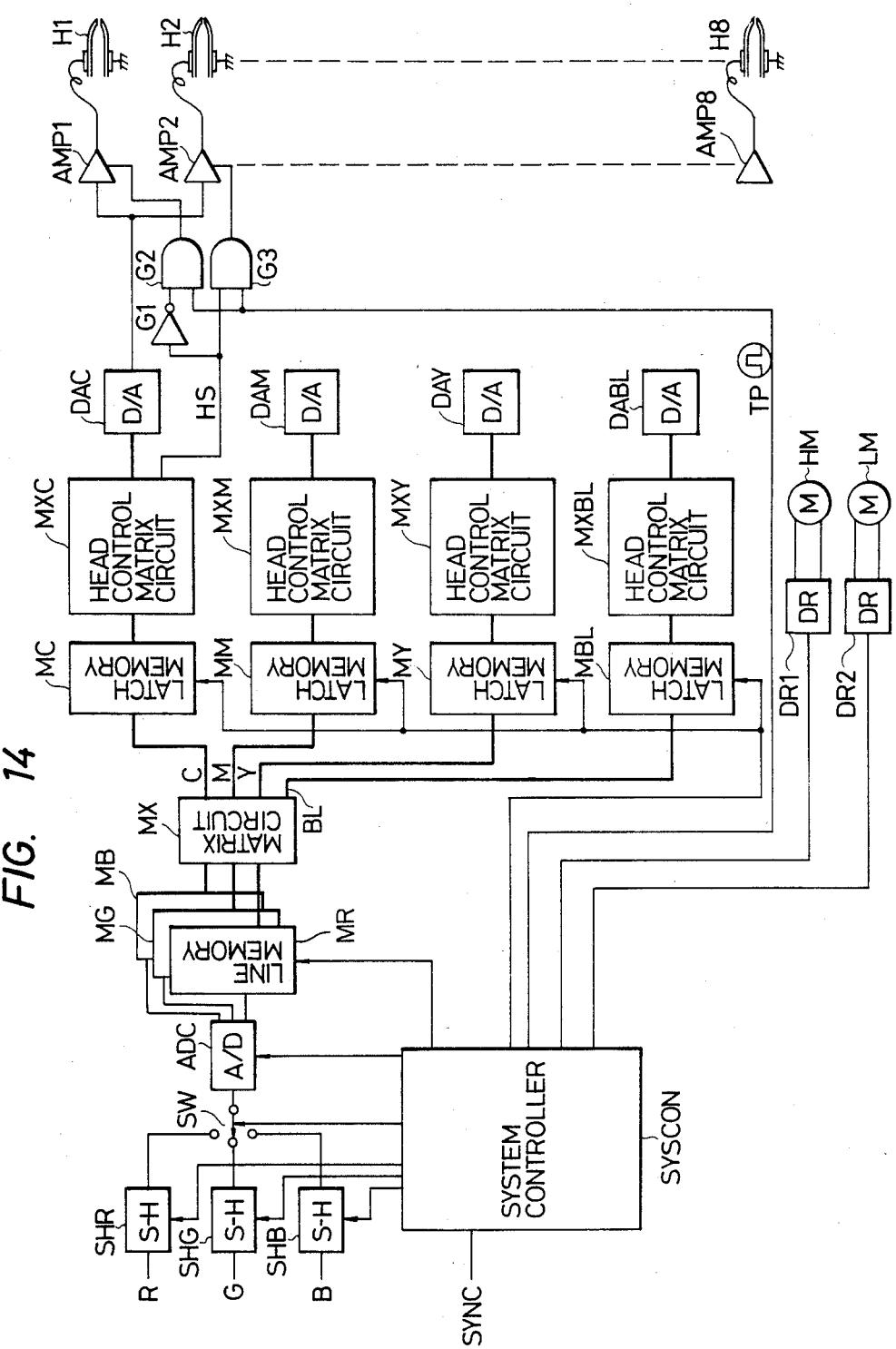
FIG. 14 is a control block diagram of a color video printer.

FIG. 14 shows an embodiment of a control circuit when the apparatus of FIG. 10 is applied to a printer to print out a color video signal. Video signals R, G and B are applied to sample-hold circuits SHR, SHG and SHB, respectively, and a synchronizing signal SYNC is applied to a system controller SYSCON. The video signals are sampled and held in accordance with a timing signal from SYSCON. The sampled outputs of the color video signals are stored in line memories MR, MG and MB through a signal selection switch SW and an A/D converter ADC. The information stored in the line memories MR, MG and MB are processed by a matrix circuit MX for masking and background elimination, and the matrix circuit MX produces a cyan signal C, a magenta signal M, a yellow signal Y and a black signal BL. The output signals C, M, Y and BL are stored in latch memories MC, MM, MY and MBL, respectively, and the output signals therefrom are applied to head control matrix circuits MXC, MXM, MXY and MXBL, respectively, which convert the output signals of the latch memories to coded signals representing the heads to be selected and the voltages to be applied. The coded signals are applied to D/A converters DAC, DAM, DAY and DABL where they are converted to analog voltages, which are then applied to head drivers AMP1–AMP8 to drive the head selected by a head selection signal HS by a desired timing signal TP to control a discharge amount of ink droplet.

Figure 15:
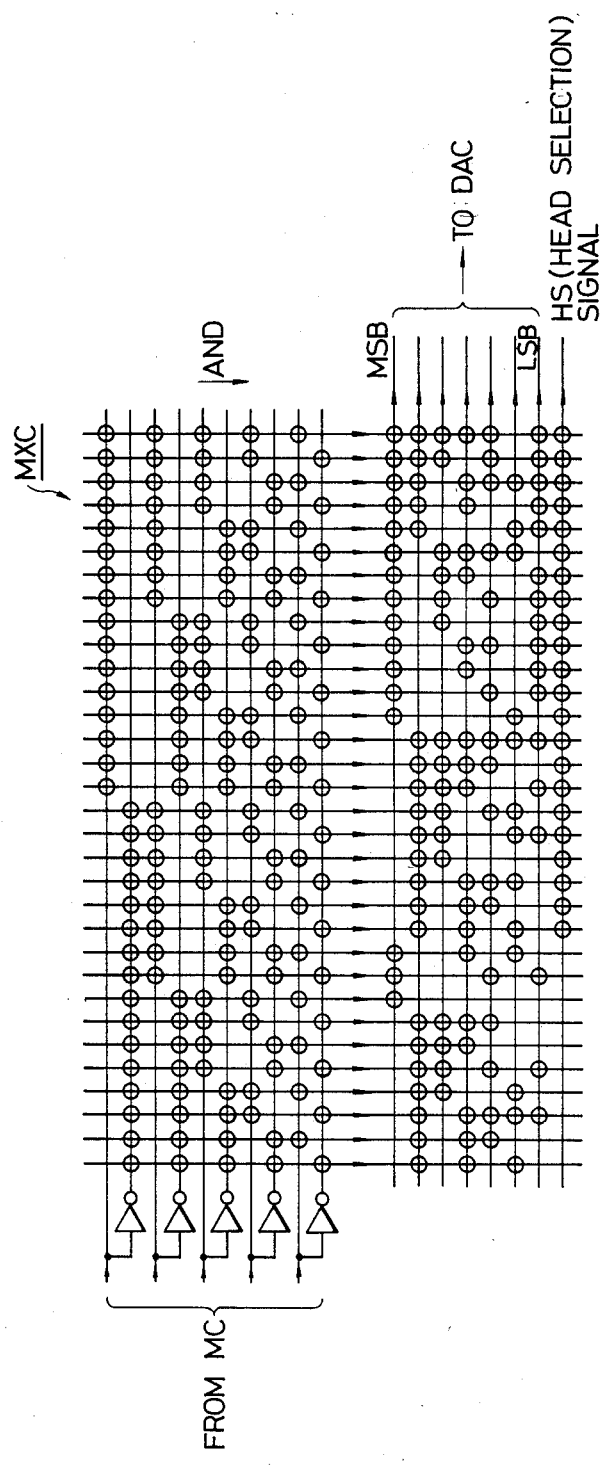
FIG. 15 is a detailed circuit diagram of a head control matrix circuit MXC of FIG. 14.
Figure 16:
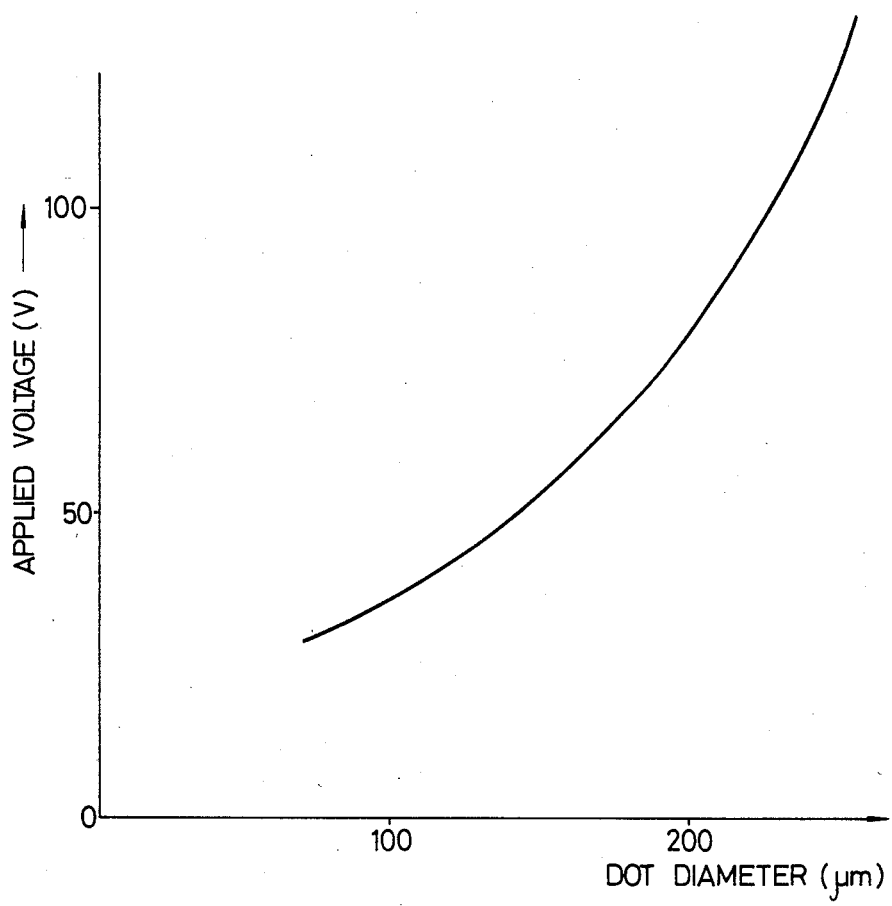
FIG. 16 is a dot diameter versus applied voltage characteristic chart of a cyan ink head.

FIG. 15 shows a detail of the cyan head control matrix circuit MXC and FIG. 16 shows a relation between the voltages applied to the cyan ink discharging heads H1 and H2 and a dot diameter. The relation between the dot diameter and the reflection density is shown in FIG. 11. The matrix circuit MXC produces digital signals of the voltages to be applied to the heads which are determined by the head selection signal HS and the characteristics shown in FIGS. 11 and 16 in accordance with the digital signal representing a cyan density.

FIG. 17 shows a relation between the input digital value and the output code of the matrix circuit of FIG. 15, a relation between the code and the selected head and the applied voltage, and a resulting reflection density. In FIG. 17, H1 denotes the low density ink head and H2 denotes the high density ink head.

By setting the applied voltage to the low density ink head to 42–74 volts and the applied voltage to the high density ink head to 42–125 volts, an average reflection density of 0.2–0.45 is attained for the low density head and an average reflection density of 0.45–1.2 is attained for the high density head. Even when the input digital signal is "00000", a white area is not produced because small dots are formed by the low density ink. The signals from the system controller SYSCON are applied to a head motor HM and a paper feed motor LM through drivers DR1 and DR2, respectively, to control the head movement and the paper feed.

Figure 18:
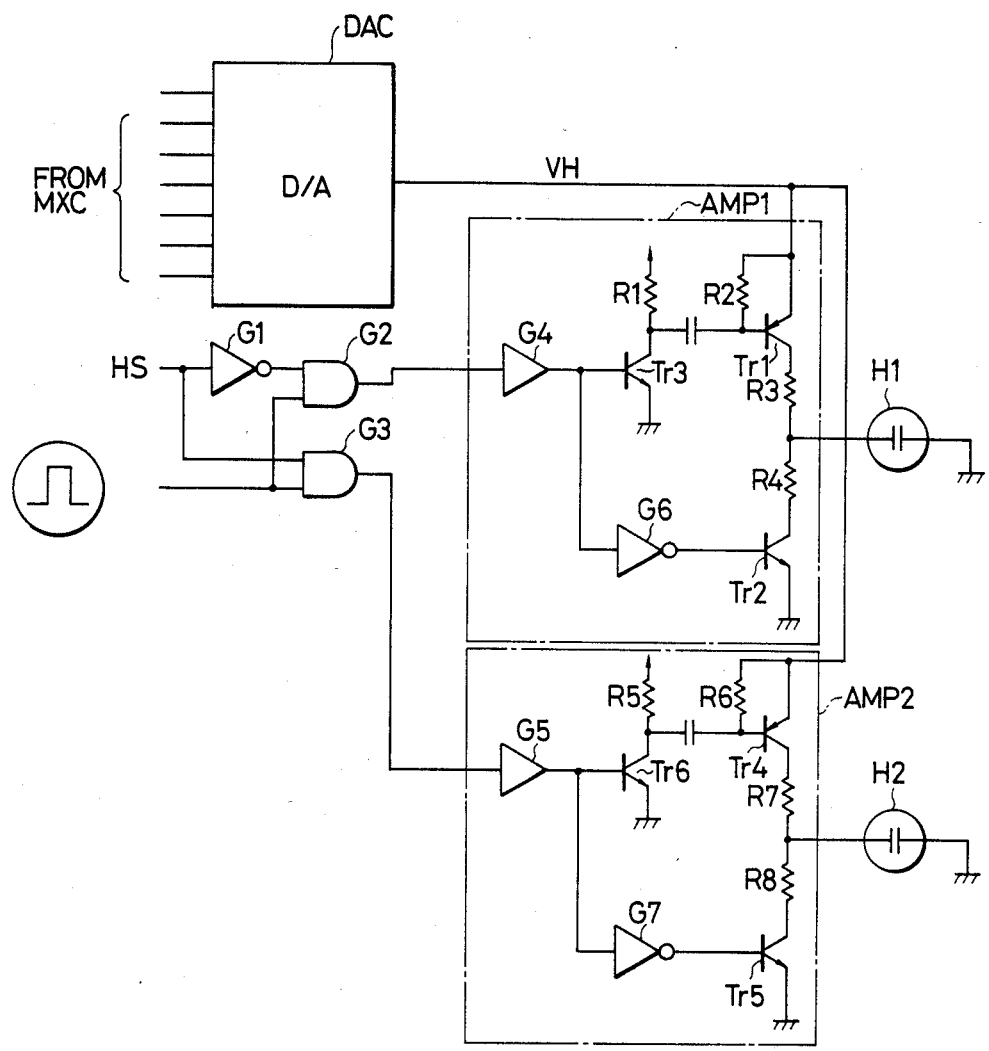
FIG. 18 is a detailed circuit diagram of a head driver of FIG. 14, FIGS. 19, 20 and 21 are dot diameter versus average reflection density characteristics charts in fourth, fifth and sixth embodiments.

FIG. 18 shows a detail of the head driver of FIG. 14. The control of the ink jet head is explained with reference to FIG. 18 for the processing of the cyan signal. The 7-bit digital signal from the matrix circuit MXC shown in FIG. 14 is supplied to the DA converter DAC which converts the digital signal to a voltage $V_H$. The head selection signal HS from the matrix circuit MXC is supplied to one input terminal of an AND gate G3 and one input terminal of an AND gate G2 through an inverter G1. When the signal HS is of a low level, the head H1 is selected, and when the signal HS is of a high level, the head H2 is selected. A head drive pulse from the system controller SYSCON is applied to the other input terminals of the AND gates G2 and G3. The operation of the head H1 when the signal HS is low is now explained. Since the one input terminal of the AND gate G2 is high, when the head drive pulse is high, the output of the AND gate G2 is high and an output of a buffer G4 is high. Accordingly, a transistor Tr3 is turned on and a transistor Tr1 is also turned on. Thus, the voltage $V_H$ is applied to the head H1 through a resistor R3. As a result, a piezo resonator is contracted diametrically of the glass tube to discharge a colored ink droplet. The amount of the discharged colored ink droplet is controlled by the voltage $V_H$.

A transistor Tr2 is now off because an output of an inverter G6 is low. When the pulse assumes the low level, the transistor Tr1 is turned off and the transistor Tr2 is turned on. Thus, the charge in the head H1 is discharged through a resistor R4 and the piezo resonator is restored to the original state. In this manner, the ink discharge is controlled.

While only the cyan ink has been described above, similar control circuits are provided for the magenta, yellow and black inks.

While the control circuit for the Embodiment 1 shown in FIG. 11 has been described above, similar control circuits may be used for the Embodiments 2 and 3 shown in FIGS. 12 and 13.

Figure 1:
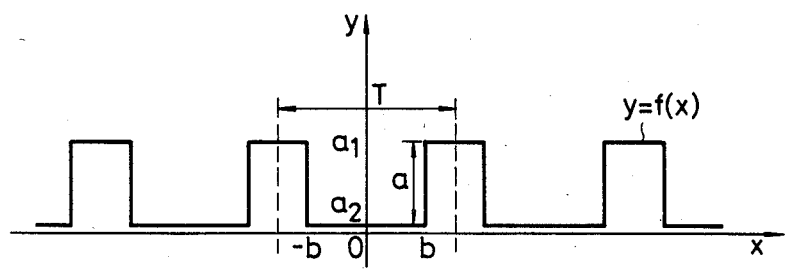
FIGS. 1 to 7 illustrate relations among a dot density, a dot duty factor, the number of pels of the dots and an image quality.
Figure 2:
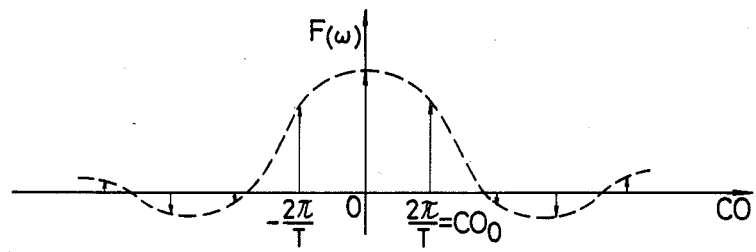
Figure 3:
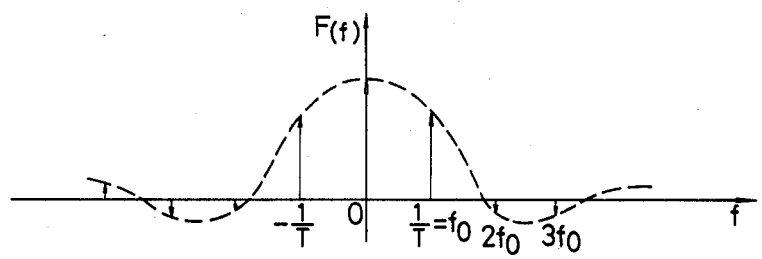
Figure 4:
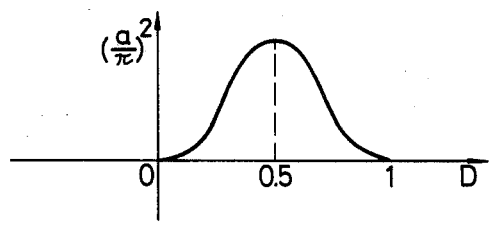
Figure 5:
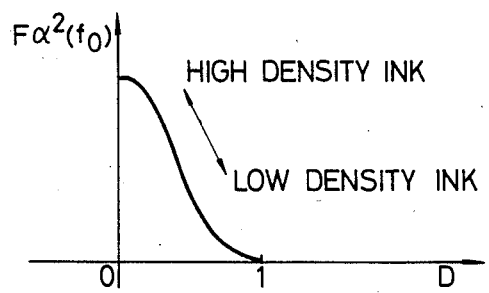
Figure 6:
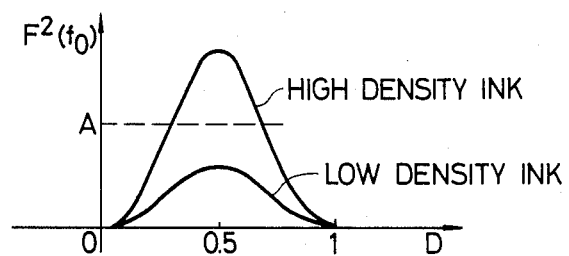
Figure 7:
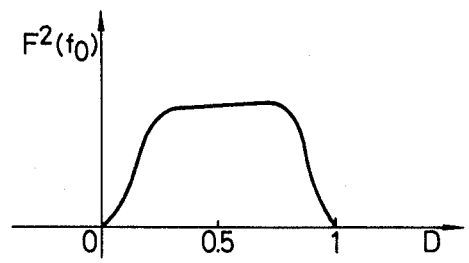

In the Embodiments 1–3, the lower limits of the duty factors are 0.6 (FIG. 11), 0.65 (FIG. 12) and 0.7 (FIG. 13) for the high density ink. According to the teaching of the present invention, however, the duty factor is no less than 0.5 for the high density elementary pattern marks and it should be understood that the present invention is not limited to those embodiments. According to the analysis described before, a peak of the feeling of roughness is at a point of the duty factor of 0.5. Thus, by selecting the duty factor to be no less than 0.5, the feeling of roughness is reduced at least to one half and the quality of the pattern formed is significantly improved. It is, of course, advisable to raise the lower limit of the duty factor as the density increases so that an area exceeding A shown in FIG. 6 is reduced or substantially eliminated. In this manner, a remarkable effect is attained.

In the following embodiments, the cyan ink is specifically considered. The cyan ink used is a direct blue ink having a color index of 86. The ink density is represented by a dye or pigment content.

Embodiment 4

Figure 19:
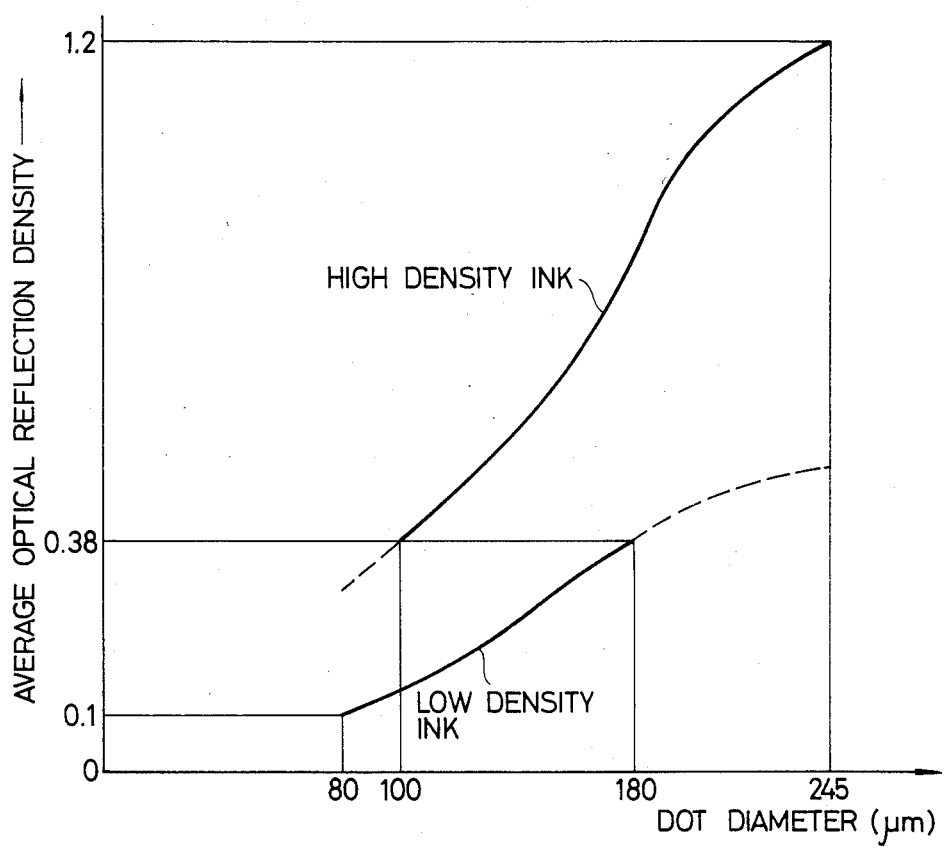

The dots were printed at 5 pels by the ink jet printer shown in FIGS. 9 and 10. A resulting characteristic is shown in FIG. 19. Solid lines indicate usable ranges of the inks and broken lines indicate non-usable ranges although dots are represented in those ranges. As seen from FIG. 19, the dot diameter formed by the respective ink heads is 80 $\mu$m–245 $\mu$m for both the high density ink and the low density ink. The range of the average optical reflection density is 0.3–1.2 for the high density ink and 0.1–0.5 for the low density ink. Thus, the average reflection densities for the high density ink and the low density ink overlap in the range of 0.3–0.5.

Within this range of average reflection density, the dots can be represented by any one of the inks. In the present embodiment, however, a point at which the dot diameter of the high density ink reaches 100 $\mu$m, that is, an average optical reflection density of 0.38 is selected as a switching level.

Thus, the low density ink covers the average optical reflection density range of 0.1–0.38 and the high density ink covers the average optical reflection density range of 0.38–1.2. A minimum dot diameter is 100 $\mu$m for the high density ink and 80 $\mu$m for the low density ink.

The high density ink used has a density of 4.0% by weight and the low density ink used has a density of 0.4% by weight. The both ink jet heads have an orifice diameter of 50 $\mu$m.

By setting the minimum dot diameter of the high density ink to be larger than the minimum dot diameter of the low density ink, the area represented by the high density ink imparts no substantial difference in the feeling of quality than the area represented by the low density ink and roughness is not noticeable.

In the present embodiment, like the Embodiments 2 and 3 described above and Embodiments 5 and 6 to be described later, the dots are formed at 5 pels for the minimum density area or the maximum intensity area. As a result, a white area is prevented and change of tone in the image is prevented. This contributes to the improvement of the image quality.

Embodiment 5

Figure 20:
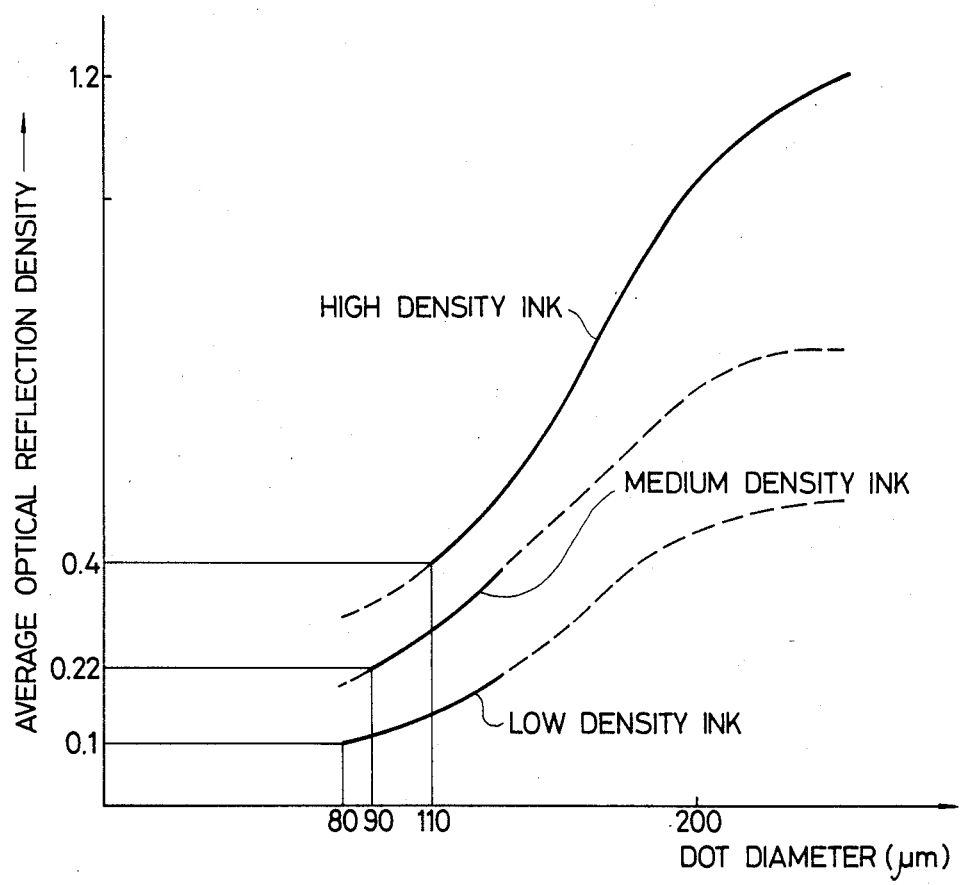

FIG. 20 shows a dot diameter versus average optical reflection density characteristic in the Embodiment 5. In the present embodiment, three ink jet heads are used instead of the two ink jet heads 6 and 7 shown in FIG. 9 and three ink tanks are used so that high density ink (density: 4.0% by weight), medium density ink (density: 0.5% by weight) and low density ink (density: 0.2% by weight) are discharged from the respective ink jet heads. All of the three ink jet heads have an orifice diameter of 50 $\mu$m. As seen from FIG. 20, the low density ink covers the average optical reflection density range of 0.1–0.22, the medium density ink covers the range of 0.22–0.4 and the high density ink covers the range of 0.4–1.2. The minimum dot diameter is 80 $\mu$m for the low density ink, 90 $\mu$m for the medium density ink and 110 $\mu$m for the high density ink.

No substantial difference in the feeling of quality was observed among the areas printed by those three inks, and no feeling of roughness was observed. A minimum reflection density of 0.1 was attained.

Embodiment 6

Figure 21:
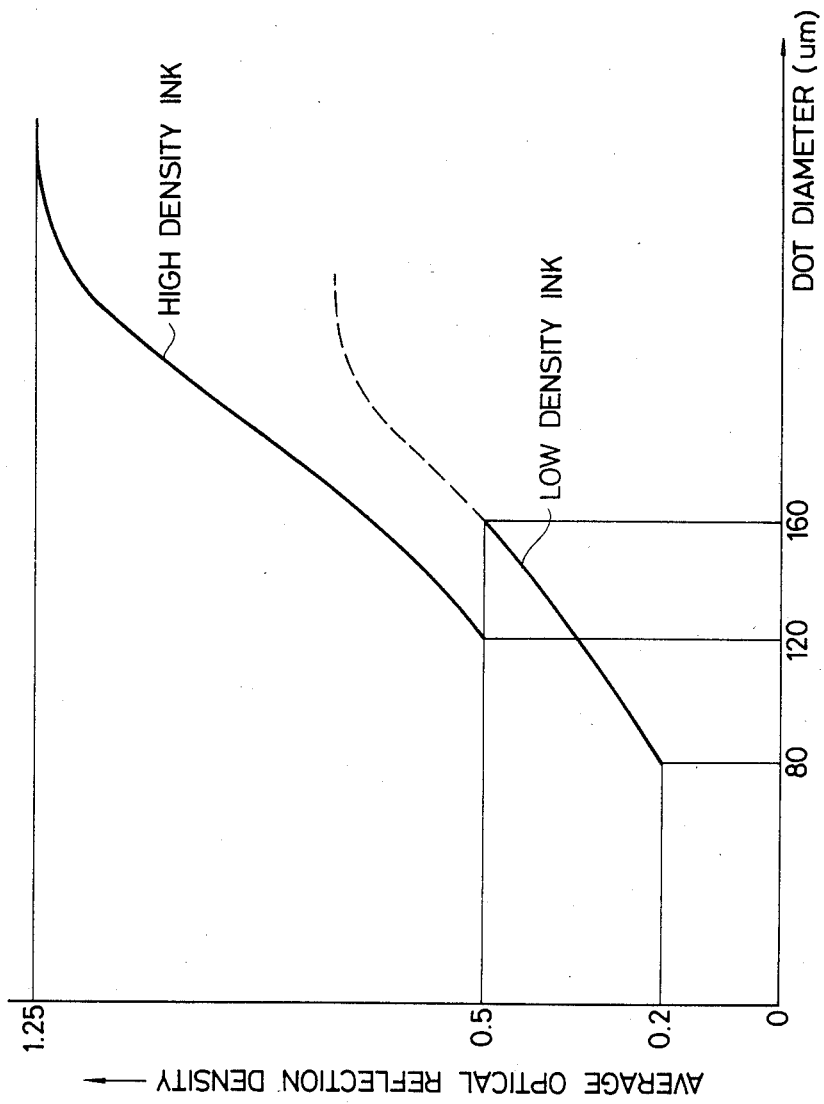

FIG. 21 shows a dot diameter versus average optical reflection density characteristic obtained when the orifice diameters of the ink jet heads 6 and 7 of FIG. 9 are 50 μm and 65 μm, respectively, the low density ink (density: 0.5% by weight) is discharged by the 50 μm orifice diameter head and the high density ink (density: 4% by weight) is discharged by the 65 μm orifice diameter head.

As seen from FIG. 21, a minimum dot diameter of 120 μm and a maximum dot diameter of 290 μm are attained with the high density ink head. Accordingly, an average optical reflection density of up to 1.25 is attained. By using the high density ink head having the large orifice diameter, a wide reflection density range is attained.

Since the dot pitch is 200 μm (5 pels), the one-dimensional duty factor D of the high density ink is 120 μm/200 μm=0.6 for the minimum dot. Therefore, stimulation to the eye is very low according to theoretical analysis.

It should be understood that by using three inks of different densities with different orifice diameters in combination with the embodiment of FIG. 20, a wider reflection density range is attained and a high tonality of image is reproduced.

The control circuits for implementing the Embodiments 4-6 may be similar to that shown in the block diagram of FIG. 14.

Figure 22:
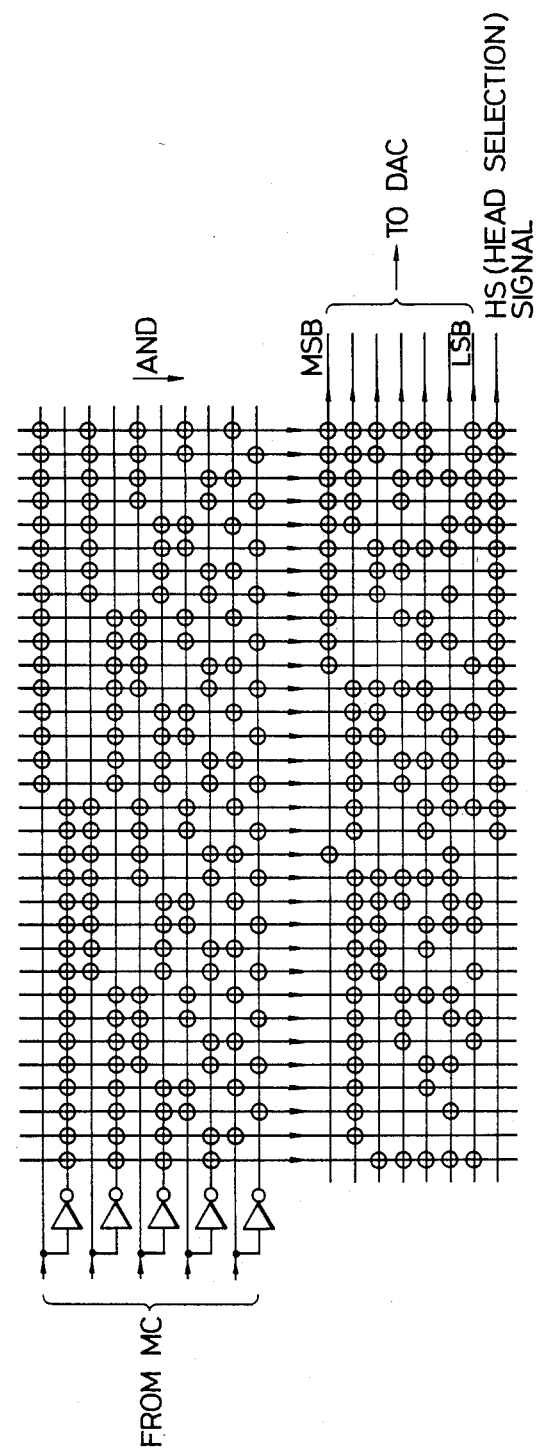
FIG. 22 is a detailed circuit diagram of the head control matrix circuit MXC of FIG. 14 for attaining the fourth embodiment.

FIG. 22 shows a detail of the cyan head control matrix circuit MXC for implementing the Embodiment 4. FIG. 16 shows a relation between the applied voltages to the cyan ink discharging heads H1 and H2 and the dot diameter. The relation between the dot diameter and the reflection density is shown in FIG. 19.

The matrix circuit MXC produces digital signals of the applied voltages to the respective heads which are determined by the head selection signal HS and the characteristics shown in FIGS. 19 and 16 in accordance with the digital signal representing the cyan density.

FIG. 23 shows a relation between the input digital value and the output code of the matrix circuit of FIG. 22, a relation between the code and the selected head and the applied voltage, and a resulting reflection density.

By setting the applied voltage to the low density ink head to 31-66 volts and the applied voltage to the high density ink head to 36-125 volts, an average reflection density of 0.1-0.38 is attained for the low density head and an average reflection density of 0.38-1.2 is attained for the high density head. Even when the input digital signal is "00000", a white area is not produced because small dots are formed by the low density ink. The 7-bit digital signal from the matrix circuit MXC shown in FIG. 22 is supplied to the DA converter DAC (FIG. 18) which converts the digital signal to a voltage $V_H$. The head selection signal HS from the matrix circuit MXC is supplied to one input terminal of an AND gate G3 and one input terminal of an AND gate G2 through an inverter G1. When the signal HS is of a low level, the head H1 is selected, and when the signal HS is of a high level, the head H2 is selected. A head drive pulse from the system controller SYSCON is applied to the other input terminals of the AND gates G2 and G3. The operation of the head H1 when the signal HS is low is now explained. Since the one input terminal of the AND gate G2 is high, when the head drive pulse is high, the output of the AND gate G2 is high and an output of a buffer G4 is high. Accordingly, a transistor Tr3 is turned on and a transistor Tr1 is also turned on. Thus, the voltage $V_H$ is applied to the head H1 through a resistor R3. As a result, a piezo resonator is contacted diametrically of the glass tube to discharge a colored ink droplet. The amount of the discharged colored ink droplet is controlled by the voltage $V_H$.

A transistor Tr2 is now off because an output of an inverter G6 is low. When the pulse assumes the low level, the transistor Tr1 is turned off and the transistor Tr2 is turned on. Thus, the charge in the head H1 is discharged through a resistor R4 and the piezo resonator is restored to the original state. In this manner, the ink discharge is controlled.

While only the cyan ink has been described above, similar control circuits are provided for the magenta, yellow and black inks.

While the control circuit for the Embodiment 4 has been described above, similar control circuits may be used for the Embodiments 5 and 6.

While an ink jet printer has been specifically described in the specification, the present invention is equally applicable to any dot printer capable of printing at different densities such as an electrographic printer, an electrostatic printer and a thermal printer.

The present invention is also applicable to a recording method and a recording apparatus as disclosed by West Germany OS No. 2843064 (laid open on Apr. 12, 1979) filed by the present applicant. Moreover, the dot shape is not limited to a circle but various other shapes may be used.

As described hereinabove, the image forming apparatus of the present invention comprises the dot forming means for forming fine dots of different densities and the dot control means for controlling the size of the dots, and sets the minimum dot diameter of the high density ink to be larger than the minimum dot size of the low density ink. Accordingly, a wide density range is covered with a simple construction and stimulation to the eye by the dots of the high density ink is relieved and roughness of the printed image is rendered unnoticeable.

Thus, the present invention attains high tonality and high quality of image with a simple construction.

In accordance with the pattern forming method of the present invention, the lower limit of the duty factor is set to 0.5 for the high density ink. Therefore, the feeling of roughness is reduced to one half and image quality is improved.

The present invention is not limited to the illustrated embodiments but various changes and modifications may be made.

What is claimed is:

1. A half tone image forming method for forming a half tone image by arranging elementary pattern marks in response to a signal representing the optical density of the image, the method comprising the steps of:
   providing a plurality of types of elementary pattern marks with different inherent densities;
   arranging the elementary pattern marks on a recording medium at equal distances;
   selecting one of the types of elementary pattern marks in response to the signal; and varying the size of the elementary pattern marks in response to the signal such that the ratio of the dimension across elementary pattern marks of the highest inherent density to the distance therebetween is at least about 0.5.

2. A half tone image forming method according to claim 1, wherein the elementary pattern marks are dots.

3. A half tone image forming method according to claim 1, wherein the predetermined distance is more than about 100 $\mu$m.

4. A half tone image forming method according to claim 1, wherein the lower limit of said ratio is raised as the optical density of the type of elementary pattern mark of the highest density increases.

5. A half tone image forming method according to claim 1, wherein said equal distance is longer than a predetermined distance.

6. A half tone image forming method according to claim 1, wherein the elementary pattern marks are formed by pattern forming material containing dyes or pigments.

7. A half tone image forming method according to claim 6, wherein said pattern forming material is a liquid such as an ink.

8. A half tone image forming method according to claim 7, wherein said elementary pattern marks are dots formed by projecting droplets of said liquid onto the recording medium.

9. An image forming apparatus comprising:
dot forming means for forming dots of different densities on a recording medium; and
dot control means for controlling the size of said dots, wherein said dot control means sets the minimum diameter of higher density dots to be larger than the minimum diameter of lower density dots.

10. An image forming apparatus according to claim 9 wherein the ratio of the diameter of the higher density dots in a direction of an array to the distance therebetween is no less than 0.5.

11. An image forming apparatus according to claim 9, wherein said dots are formed by pattern forming material containing dyes or pigments.

12. An image forming apparatus according to claim 11, wherein said pattern forming material is a liquid such as an ink.

13. An image forming apparatus according to claim 12, wherein said dot forming means includes a liquid droplet ejection device for ejecting said liquid.

14. A half tone image forming method for forming a half tone image on a white recording medium, the method comprising the steps of:
providing a signal the level of which represents tonal components of the image;
providing a plurality of kinds of dots with different inherent densities;
selecting one kind of dot in accordance with the level of the signal; and
controlling the dot size in accordance with the level of the signal so as to form the image on the recording medium, wherein dots are provided even though the signal level is at the minimum thereof, dots formed for the minimum signal level having the minimum inherent density and dot size.

15. A half tone image forming method according to claim 14, wherein said dots are formed by pattern forming material containing dyes or pigments.

16. A half tone image forming method according to claim 15, wherein said pattern forming material is a liquid such as an ink.

17. A half tone image forming method according to claim 16, wherein said dot forming means includes a liquid droplet ejection device for ejecting said liquid.

* * * * *

UNITED STATES PATENT AND TRADEMARK OFFICE
CERTIFICATE OF CORRECTION

PATENT NO. : 4,560,997

DATED : December 24, 1985

INVENTOR(S) : YUICHI SATO, ET AL.

It is certified that error appears in the above-identified patent and that said Letters Patent is hereby corrected as shown below:

COLUMN 1

Line 13,    "representation;" should read --representations;--.

COLUMN 3

Line 6,    " $\left[\dfrac{\sin \pi DTF}{\pi\ TDF}\right]$ " should read -- $\left[\dfrac{\sin \pi DTf}{\pi\ TDf}\right]$ --.

Line 21,    "represent" should read --represents--.

Line 23,    "represent" should read --represents--.

COLUMN 5

Line 43,    "for described," should read --far been described,--

Line 52,    "comprises 4X4" should read --comprises a 4X4--.

Line 62,    "4X4-matrix" should read --4X4 matrix--.

Line 64,    "first results" should read --first method results--.

COLUMN 6

Line 1,    "dizzer" should read --dither--.

Line 15,    "pixel" should read --pixcel--.

Line 64,    "being" should be deleted.

COLUMN 8

Line 10,    "but" should read --but is--.

Line 23,    "as set" should read --was set--.

Line 40,    "ink" should read --an ink--.

Line 64,    "obscissa" should read --abscissa--.

UNITED STATES PATENT AND TRADEMARK OFFICE
CERTIFICATE OF CORRECTION

PATENT NO. : 4,560,997
DATED : December 24, 1985
INVENTOR(S) : YUICHI SATO, ET AL.

It is certified that error appears in the above-identified patent and that said Letters Patent is hereby corrected as shown below:

COLUMN 12

Line 48, "a white area" should read --white area--.

COLUMN 13

Line 57, "a white area" should read --white area--.

COLUMN 14

Line 10, "contacted" should read --contracted--.
    Line 48, "attains high" should read --attains a high--.

Signed and Sealed this

Fifteenth Day of September, 1987

*Attest:*

DONALD J. QUIGG

*Attesting Officer*  *Commissioner of Patents and Trademarks*